United States Patent
Joshi et al.

(10) Patent No.: US 7,411,631 B1
(45) Date of Patent: Aug. 12, 2008

(54) POWER MANAGEMENT FOR PROCESSOR-BASED APPLIANCES

(75) Inventors: Aniruddha P. Joshi, Chandler, AZ (US); Chad W. Mercer, Chandler, AZ (US); Jenny M. Wohletz, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1900 days.

(21) Appl. No.: 09/583,432

(22) Filed: May 31, 2000

(51) Int. Cl.
*H04N 5/44* (2006.01)
*H04N 5/63* (2006.01)

(52) U.S. Cl. .................. 348/734; 348/730

(58) Field of Classification Search ............. 348/734, 348/730, 552, 143, 152, 155, 154, 156, 460, 348/473; 345/214, 211, 212, 158, 169; 455/3.03, 455/3.06; 713/320, 323, 324, 340; 725/80, 725/153, 10, 12, 58, 141, 133; *H04N 5/63, H04N 5/44*
See application file for complete search history.

(56) References Cited

U.S. PATENT DOCUMENTS

| | | | | |
|---|---|---|---|---|
| 4,800,437 A | * | 1/1989 | Hosoya | 348/207.99 |
| 4,989,081 A | * | 1/1991 | Miyagawa et al. | 348/734 |
| 5,513,359 A | * | 4/1996 | Clark et al. | 713/323 |
| 5,765,001 A | * | 6/1998 | Clark et al. | 713/340 |
| 5,923,362 A | * | 7/1999 | Klosterman | 725/58 |
| 6,141,488 A | * | 10/2000 | Knudson et al. | 725/58 |
| 6,205,318 B1 | * | 3/2001 | Schindler et al. | 455/3.06 |
| 6,259,486 B1 | * | 7/2001 | Mahvi | 348/553 |
| 6,285,406 B1 | * | 9/2001 | Brusky | 348/552 |
| 6,292,943 B1 | * | 9/2001 | Shin et al. | 725/58 |
| 6,393,573 B1 | * | 5/2002 | Gillespie et al. | 713/324 |

FOREIGN PATENT DOCUMENTS

JP 2000-324688 * 11/2000

* cited by examiner

*Primary Examiner*—Sherrie Hsia
(74) *Attorney, Agent, or Firm*—Trop, Pruner & Hu, P.C.

(57) ABSTRACT

A processor-based system may be operated in an effectively "always on" condition. The system may transition from a lower power consumption state to a higher power consumption state in response to the first operation of a power button. In response to a second operation of the power button, the system transitions from the higher power consumption state to the lower power consumption state. However, unless the system is unplugged, the system remains in a power consuming state even when the power button is repeatedly operated.

16 Claims, 3 Drawing Sheets

POWER MANAGEMENT FOR PROCESSOR-BASED APPLIANCES

BACKGROUND

This invention relates generally to processor-based appliances such as set-top boxes and particularly to power management for such devices.

Some processor-based systems are intended to operate as appliances. Consumers may believe that appliances should operate with certain characteristics. For one, when an appliance is turned on, it should immediately operate. To some degree this is inconsistent with the way many processor-based systems operate. In those systems, when the device is turned on, a boot process must be undertaken before the device is ready to operate. This delay in "active on" operation may create, for many consumers, the conception that such processor-based systems are not as easy to use as an appliance. The consumer may prefer electronic devices that operate in the fashion the consumer is accustomed to with other appliances.

A set-top box is a processor-based appliance that operates with a conventional television receiver. For example, the set-top box may sit atop a conventional television receiver. The set-top box may provide computer functionality, such as Internet access, as well as control over the television. For example, the set-top box may provide an electronic programming guide (EPG) to facilitate the operation of the television receiver. Conventionally, the television receiver acts as the monitor for computer operations as well.

The set-top box bridges television and computer functionalities. It is desirable that the set-top box act like other appliances such as a television receiver.

Thus, there is a need for ways to make processor-based appliances operate in a fashion similar to other appliances.

DETAILED DESCRIPTION

Figure 1:
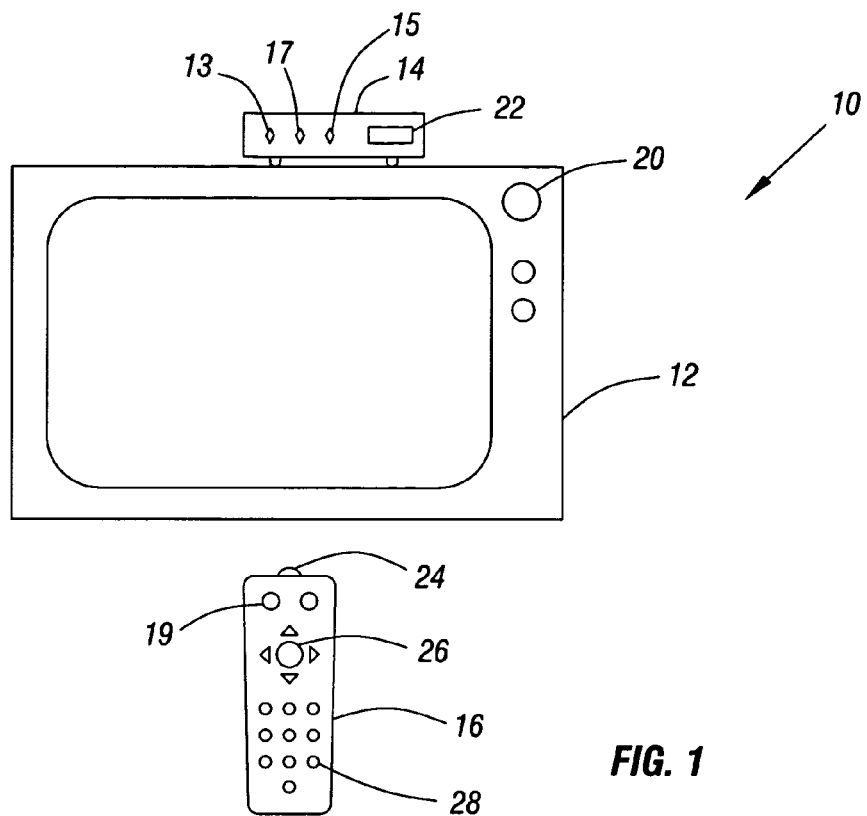
FIG. 1 is a front elevational view of one embodiment of the present invention.

A processor-based system 10, shown in FIG. 1, may include a display such as a television receiver 12 and a computer such as a set-top box 14, in accordance with one embodiment of the present invention. The set-top box 14 and the receiver 12 may both be operated using a remote control unit 16. The remote control unit 16 may include a power button 19 in one embodiment of the present invention. Similarly, the set-top box 14 may include a power button 13 in accordance with one embodiment of the present invention.

The set-top box 14 also includes an interface 22 that operates with an interface 24 on the remote control unit 16. The interface 24 on the remote control unit 16 also operates an interface 20 on the television receiver 12. Thus, in one embodiment of the present invention, the interface 24 may be an infrared interface that operates infrared interfaces 20 and 22 on the television receiver 12 and the set-top box 14 respectively.

The remote control unit 16 also includes cursor control buttons 26 that enable the remote control unit 16 to provide mouse-like functions. Control buttons 28 on the remote control unit 16 enable the selection of television channels and other operations.

The set-top box 14 may also include a pair of sensors 15 and 17. The light sensor 15 may be a light detector that detects the amount of light in the surrounding area. For example, if the television receiver 12 is on, it may produce sufficient light to actuate the light sensor 15 in one embodiment. Similarly, a motion sensor 17 provided on the set-top box 14 detects motion in the surrounding area.

In one embodiment of the present invention, the set-top box 14 is normally maintained in a powered up state. That is, after the initial powering on of the set-top box 14, it is intended that the set-top box 14 may never be powered off again. Thus, electrical power may be supplied to the set-top box 14 at all times so that the set-top box 14 may never truly turn completely off after being plugged into an electrical outlet.

Figure 2:
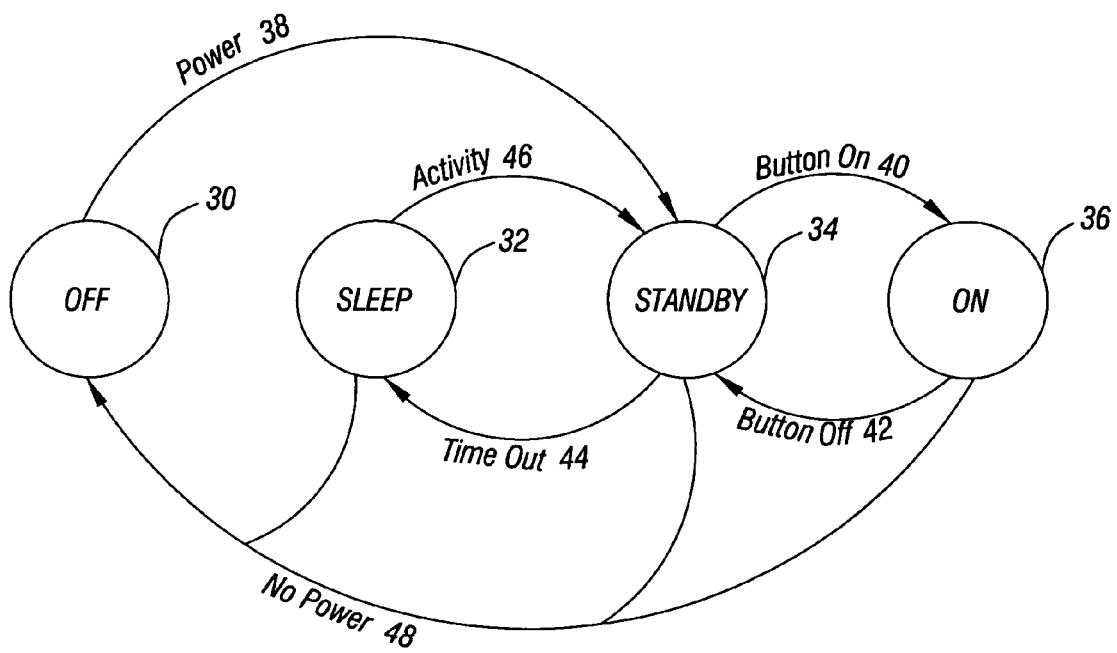
FIG. 2 is a state diagram for the embodiment of the present invention shown in FIG. 1.

Referring to FIG. 2, a state diagram for the set-top box 14 includes an "off" state 30, a "standby" state 34, an "on" state 36 and a "sleep" state 32. Before the set-top box 14 is plugged into an electrical outlet, it is in the off state 30. After it is plugged in, power is applied, as indicated by the arrow 38 and the set-top box 14 enters the standby state 34. In the standby state 34, the set-top box 14 maintains all its settings and is able to operate quickly in response to a user command. However, in the standby state 34 the set-top box 14 may be in a reduced or lower power consumption state relative to the on state 36. In an embodiment conforming to the Advanced Configuration and Power Interface (ACPI) Specification, Revision 1.0, Dec. 22, 1996, the standby state 34 may be ACPI global system state G1, the on state 36 may be ACPI global system state G0, and the sleep state 32 may be ACPI global system state G2.

In an embodiment in which the sleep state 32 is implemented in accordance with the ACPI G2 or soft off state, the set-top box 14 consumes a minimal amount of power. No user mode or system mode code is run. The G2 state generally requires a large latency in order to return to the G0 or working state. The set-top box's context may not be preserved by the hardware.

In an embodiment in which the standby state 34 is implemented in accordance with the ACPI G1 or sleeping state, the set-top box 14 consumes a smaller amount of power than in the G0 or working state, user mode threads are not executed, and the set-top box 14 appears to be off from the user's perspective because the display is off. Latency for returning to the G0 or working state varies according to the wake up environment selected prior to entry into this state. Work can be resumed without rebooting the operating system because large elements of system context are saved by the hardware and the system software.

In an embodiment in which the on state 36 is implemented in accordance with the ACPI G0 or working state, the set-top box 14 dispatches user mode application threads and may execute instructions. Peripheral devices may have their power states dynamically changed. The user may select various performance/power characteristics and may optimize software for performance or battery life. The set-top box 14 responds to external events in real time.

As soon as the user presses the power button 19 on the remote control or the power button 13 on the set-top box 14, the system 10 immediately transitions to the on state 36 as indicated by the arrow 40. This is different than conventional processor-based systems in that operation of a power button 13 or 19 does not apply power to the set-top box 14, but instead transitions the set-top box 14 from the standby state 34 to the on state 36. Thus, as described above, absent unplugging the set-top box 14 from the wall plug, power is always applied.

When the user operates a power button 13 or 19 again, either through the remote control unit 16 or on the set-top box 14, the set-top box 14 resumes the standby state 34 as indicated by the arrow 42. If at any time, power is removed from the set-top box 14 by unplugging it from the wall plug, the set-top box 14 immediately returns to the off state 30, as indicated by the arrow 48.

In some embodiments of the present invention, the sleep state 32 is not used. However, in an embodiment with the sleep state 32, if the set-top box 14 remains in the standby state 34 for a sufficiently long period of time, it may transition to the sleep state 32 as indicated by the arrow 44. However, if activity is detected, as indicated by the arrow 46, the set-top box 14 immediately returns to the standby state 34.

In the sleep state 32, the set-top box 14 may be in an even lower power consumption state than in the standby state 34. When in the sleep state 32, the set-top box 14 may be unable to immediately return to the fully operational state. That is, a time delay may be required to transition from the sleep state 32 to the standby state 34 and then on to the on state 36. The transition from the sleep state 32 to the on state 36 may take more time than the transition from the standby state 34 to the on state 36 in one embodiment.

It may be undesirable for the set-top box 14 to place the television receiver 12 in a powered down state. The user may want to watch the television receiver 12 without using any of the set-top box 14 functions. The mere fact that no activity is occurring on the set-top box 14 does not necessarily suggest that the user is not actively using the television receiver 12.

In embodiments using the sleep state 32, to prevent extended operation in the sleep state 32, a pair of sensors 15 and 17 may be provided. If the surroundings are sufficiently bright, as detected by the light sensor 15, the set-top box 14 immediately transitions from the sleep state 32 to the standby state 34. The light sensor 15 may be set so that the light produced by the television receiver 12 is sufficient to cause the transition from the sleep state 32 to the standby state 34. Similarly, if it is not dark in the surrounding room, the set-top box 14 may transition out of the sleep mode 32 in one embodiment. Furthermore, if activity is detected in the surrounding room through the motion sensor 17, the set-top box 14 is promptly returned to the standby state 34 in one embodiment.

Through the use of the sensors 15 and 17, the set-top box 14 may conserve electrical power while at the same time providing the consumer with an appliance-like operation. In some embodiments, the set-top box 14 may return to the standby state 34 before the user gets sufficiently close to either the remote control unit 16 or the set-top box 14 to operate a power button 13 or 19. Therefore, in most cases, the user may not see any delay in assuming the on state 36 in response to a power button 13 or 19 operation, in some embodiments of the present invention.

To maintain the context when transitioning from the standby state 34 to the sleep state 32, the context may be written to a non-volatile memory prior to entering the sleep state 32. The context includes all the settings which enable the system to return to the exact screen display and the same point in any application programs that were operative. If a non-volatile memory is not available, the transition to the sleep state 32 may be avoided.

Figure 3:
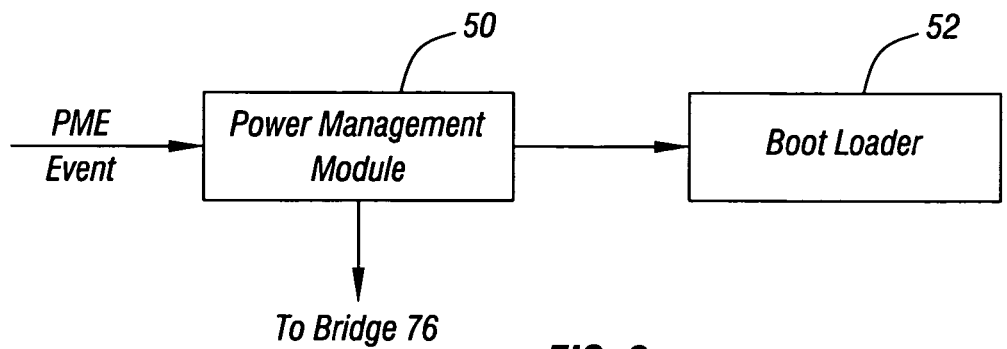
FIG. 3 shows the operation of the power management software module in accordance with one embodiment of the present invention.

Turning next to FIG. 3, a power management module 50 implements the state transitions shown in FIG. 2 in accordance with one embodiment of the present invention. The power management module 50 detects a power management event (PME). A power management event may be the operation of a power button 19 or 13 on the remote control unit 16 or the set-top box 14 respectively. A power management event may also arise from a wake-up or Local Area Network (LAN) event that occurs in connection with a cable modem.

Figure 4:
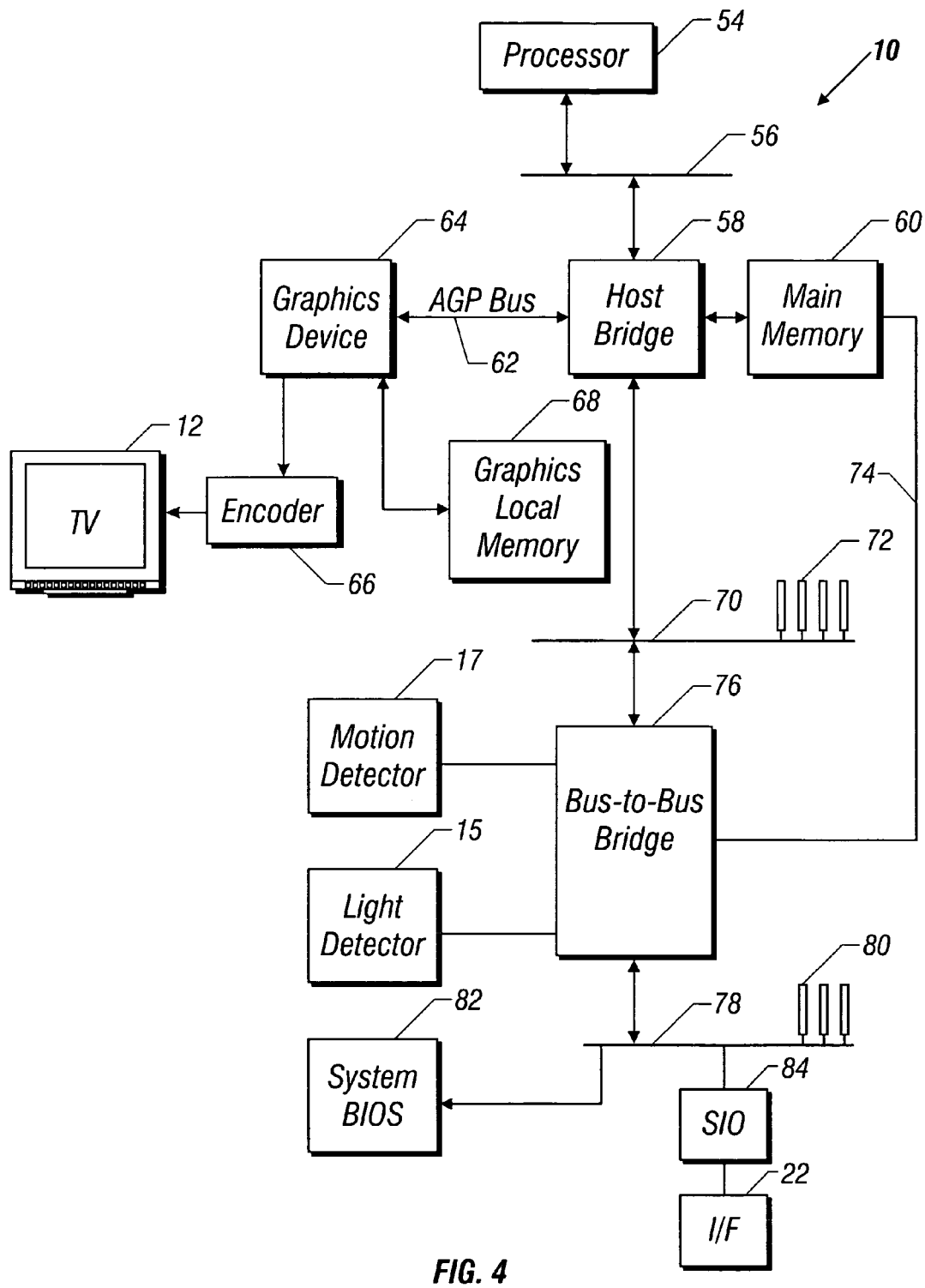
FIG. 4 is a block diagram of the system depicted in FIG. 1 in accordance with one embodiment of the present invention.

Power management events may also be generated, for example, by a conventional south bridge (such as the south bridge 76 in FIG. 4). In one embodiment of the present invention, the south bridge 76 is the 82371AB PCI ISA IDE Xcelerator (PIIX4) available from Intel Corporation. The PIIX4 includes power management firmware including registers that may be set to effectuate the functions determined by power management module 50.

The power management module 50 may be part of the operating system, at the kernel level for example or a part of the boot loader as another example. Therefore, when the set-top box 14 is in any state other then the off state 30 and a power management event occurs, the power management module 50 is notified. The module 50 then passes system control to the boot loader 52. The boot loader 52 may put the set-top box 14 into the standby state 34 by initializing the appropriate PIIX4 power management registers in one embodiment.

If the set-top box 14 is in the standby state 34 and a PME event occurs, the system wakes up to the boot loader 52. The boot loader 52 returns control to the module 50 that in turn passes control back to the operating system. Thus, the set-top box 14 may resume in the on state 36, at the settings where it last left off before entering the standby state 34. In particular, this means maintaining all the settings and states that existed when the standby state 34 was entered. If the user was active in a given software program before a PME event, the set-top box 14 may resume with all the states and conditions that last existed and with the exact same television receiver 12 screen display.

Figure 3A:
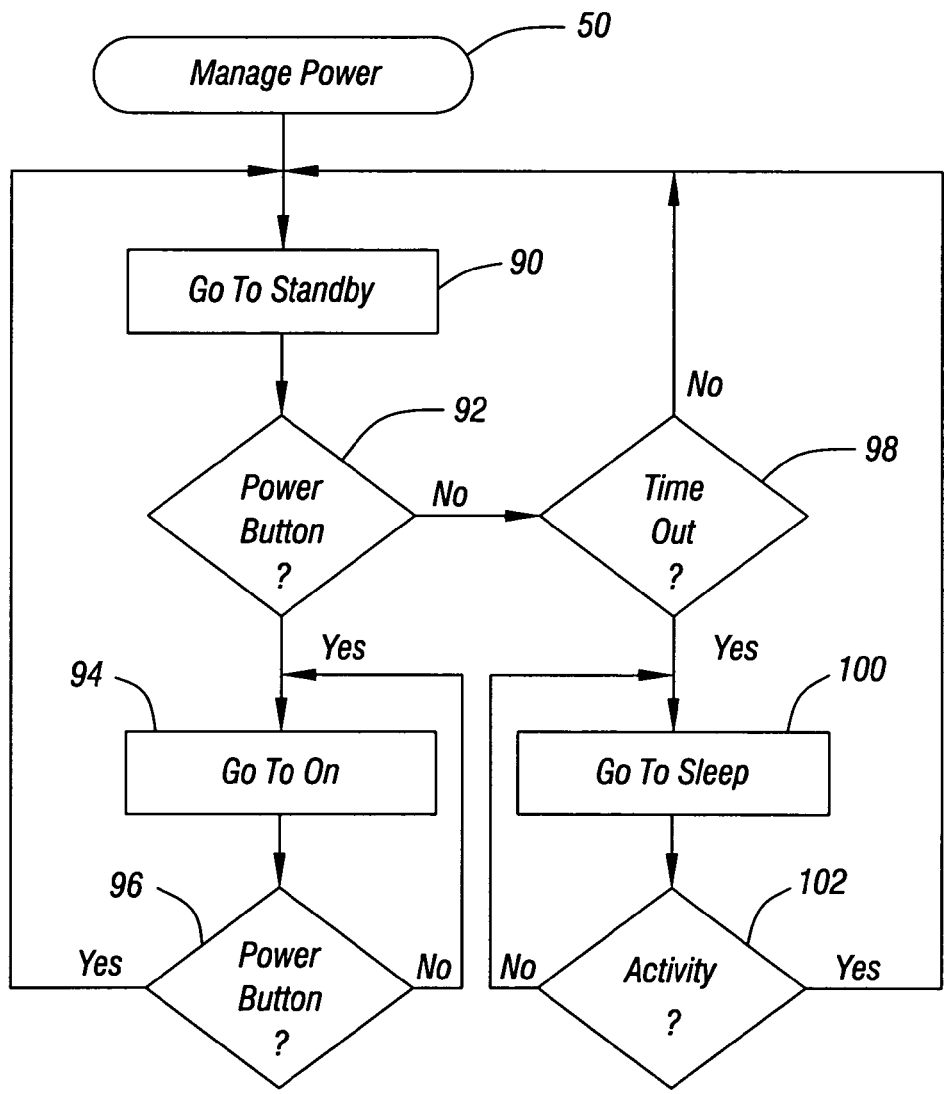
FIG. 3A is a flow chart for the software shown in FIG. 3 in accordance with one embodiment of the present invention.

Referring to FIG. 3A, the software 50 initially assumes a standby state as indicated by the block 90. That is, as soon as power is applied, the system assumes the standby state 34. At diamond 92 a check determines whether a power button has been operated. If so, the software 50 transitions to the on state 36 as indicated in block 94. Next, a check at diamond 96 determines whether the power button has been again actuated. If so, the system transitions back to the standby state 34 at block 90. Otherwise, the software 50 recycles and is maintained in the on state through the operation of block 94.

If in diamond 92 it is determined that the power button has not been operated, a check at diamond 98 determines whether a time out 44 has occurred. If a time out 44 has occurred, the software 50 assumes the sleep state 32 as indicated by block 100. At diamond 102 a check determines whether activity has been identified. Activity 46 may include detection of a light source or motion proximate to the system 10. If so, the software 50 resumes the standby state 34 via block 90. Otherwise, the software 50 is maintained in the sleep state 32.

Turning to FIG. 4, the system 10 includes a processor 54 coupled to a host bus 56 which in turn is coupled to a host bridge 58, an accelerated graphics port (AGP) bus 62 and a graphics device 64, in one embodiment of the invention. The main memory 60 may be coupled to a system management (SM) bus 74. The graphics device 64 receives video inputs and provides outputs to a television receiver 12 through an encoder 66. The graphics device 64 receives information from a graphics local memory 68. The video inputs may include television broadcasts and videocassette recorder (VCR) inputs as well as digital videodisk (DVD) information.

The host bridge 58 is coupled to a bus 70 that may receive a plurality of peripheral devices in slots 72. The bus 70 may also be coupled to a bus-to-bus or south bridge 76 that couples still another bus 78. In one embodiment of the present invention, the bridge 76 is the PIIX4 bridge available from Intel Corporation. The bus 78 may also include peripheral device receiving slots 80.

The bridge 76 may be coupled to the motion sensor 17 and the light sensor 15. In one embodiment of the present invention, the general purpose input/output (GP[I,O]) pins available with the PIIX4 bridge may be utilized to handle the signals received from the sensors 15 and 17.

The bus 78 may be coupled to the system basic input/output system (BIOS) 82 and a serial input/output (SIO) device 84. The device 84 may be in turn coupled to the interface 22 that may be an infrared interface in one embodiment of the present invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   in response to operation of a power button, transitioning a processor-based system from a lower power consumption state to a higher power consumption state; and
   in response to re-operation of said power button, transitioning said processor-based system from said higher power consumption state to said lower power consumption state;
   transitioning said processor-based system from the lower power consumption state to a still lower power consumption state in response to a lack of activity on said processor-based system; and
   transitioning from said still lower power consumption state to said lower power consumption state whenever a television receiver is operating.

2. The method of claim 1 including transitioning said system from said still lower power consumption state back to said lower power consumption state if activity is detected around said processor-based system.

3. The method of claim 2 including detecting motion around said processor-based system.

4. The method of claim 1 including transitioning said system from said still lower power consumption state back to said lower power consumption state if light is detected around said processor-based system.

5. The method of claim 1 including preventing said system from going to a power off state in response to operation of the power button.

6. The method of claim 1 including receiving a power command from a power button on a remote control unit.

7. The method of claim 1 wherein said system includes an operating system, said method including providing a power management module in connection with the operating system for said processor-based system to handle power management events.

8. The method of claim 7 wherein said power management module responds to power management events by passing control to a boot loader.

9. An article comprising a medium that stores instructions that, if executed, enable a processor-based system to:
   in response to operation of a power button, transition said processor-based system from a lower power consumption state to a higher power consumption state; and
   in response to re-operation of said power button, transition said processor-based system from said higher power consumption state to said lower power consumption state;
   transition from the lower power consumption state to a still lower power consumption state in response to a lack of activity on said system; and
   transition from still lower power consumption state to said lower power consumption state in response to operation of a television receiver.

10. The article of claim 9 further storing instructions that cause the processor-based system to transition from said still lower power consumption state back to said lower power consumption state if activity is detected around said processor-based system.

11. The article of claim 10 further storing instructions that cause the processor-based system to detect motion around said processor-based system.

12. The article of claim 9 further storing instructions that cause the processor-based system to transition from said still lower power consumption state back to said lower power consumption state if light is detected around said processor-based system.

13. The article of claim 9 further storing instructions that prevent said system from going to a power off state in response to operation of the power button.

14. The article of claim 9 further storing instructions that cause said processor-based system to receive a power on command from the power button on a remote control unit.

15. The article of claim 9 further storing instructions that cause the processor-based system to transition between said lower and higher power consumption states using a software module at an operating system kernel level.

16. The article of claim 15 further storing instructions that cause said processor-based system to respond to power management events by passing control to a boot loader.

* * * * *